Patented July 20, 1943

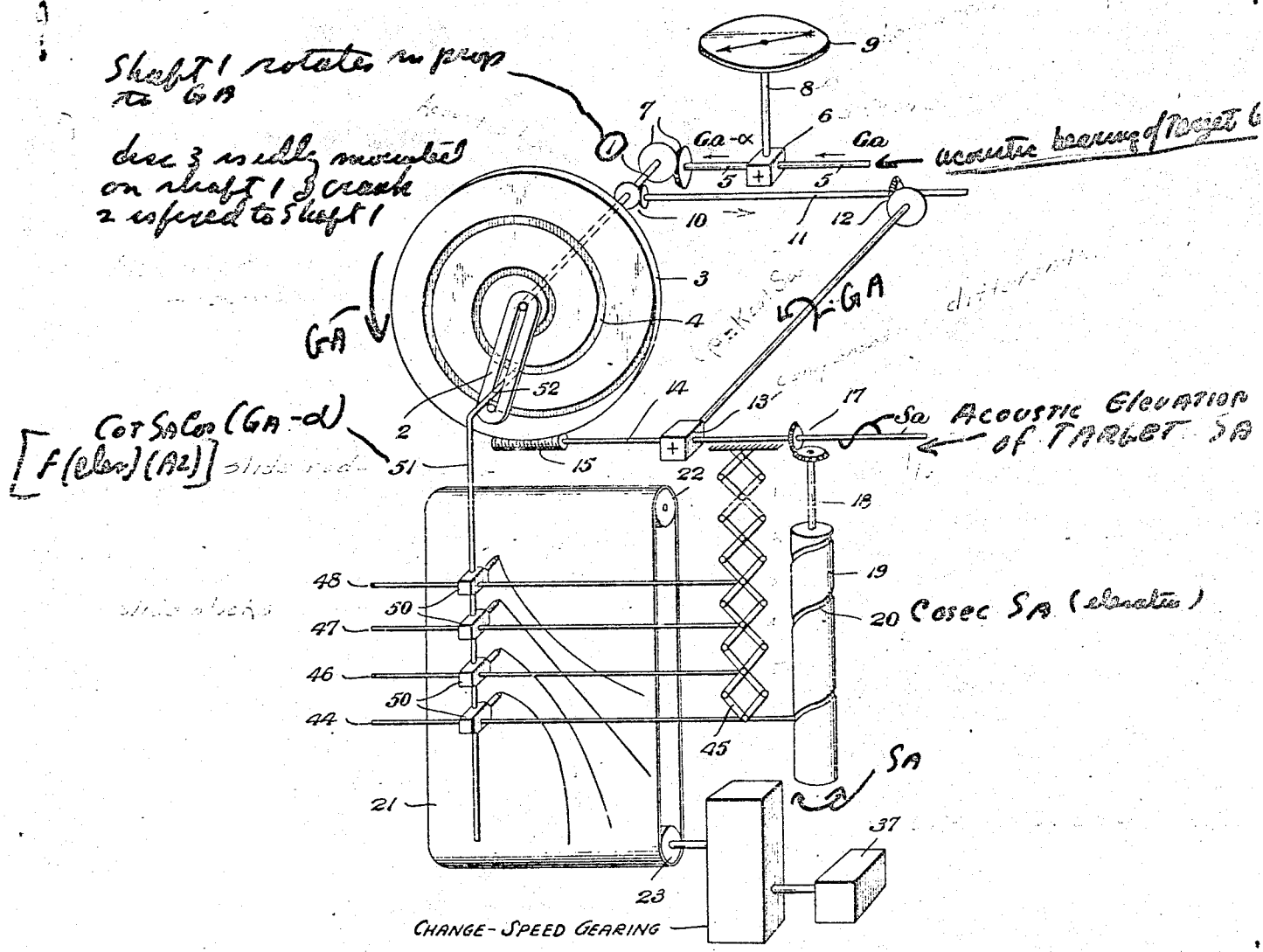

2,324,604

UNITED STATES PATENT OFFICE 2,324,604

METHOD AND MEANS FOR DETERMINING ALTITUDE

Antonin Svoboda, Forest Hills, N. Y., assignor to Abax Corporation, New York, N. Y., a corporation of New York Application May 1, 1941, Serial No. 391,248
In France May 3, 1940

5 Claims. (Cl. 33—18)

The invention relates to a method of determining the altitude of an airplane from sound received from the airplane at a single station and apparatus for carrying out the method constituting a one-station altimeter which, starting from acoustic coordinates of an airplane (angular elevation and bearing), gives the altitude of this airplane in a manner that can be directly read off, on the assumption that this altitude is constant and that the airplane is moving at a speed that is constant in magnitude and in direction.

When an airplane is flying at a constant altitude at a speed that is constant in magnitude and in direction, the rectangular co-ordinates of its horizontal projection vary as a function of the time, according to a linear law, that is to say, so that a stylus which is displaced transversely to the uniform movement of a recording surface, proportionally to one of these co-ordinates, must trace a straight line. One can determine the rectangular co-ordinates of a horizontal projection of the airplane from the acoustic co-ordinates by taking account of the time which the sound of the airplane takes to arrive at the listening station, a time which, for a fixed site, is a function of the altitude of the airplane. If a mistake is made as to the altitude of the airplane, the inexact optical co-ordinates record themselves in the form of curves which are substantially hyperbolas.

In accordance with the invention, several styli trace simultaneously, as a function of the time, from the acoustic co-ordinates of the airplane, a family of curves representing one and the same rectangular co-ordinate of the horizontal projection of the airplane, for different values attributed to the altitude. Among these curves, the one which most closely approximates a straight line corresponds to the altitude closest to reality.

In order that the graph recorded by the apparatus may extend as much as possible in the width of the strip of paper on which it is recorded, the apparatus in accordance with the invention is provided with a device which makes it possible to subtract a variable angle from the angle of acoustic bearing.

In order that the graph may be easy to read, it is obviously necessary that it should not stretch out too much in the direction of the displacement of the record strip or, on the contrary, that it shall not flatten out too much.

In the apparatus in accordance with the invention, a speed-change mechanism inserted in the control of the displacement of the record strip makes it possible to impart to this displacement the speed which is most suitable for the order of magnitude of the altitude to be determined. It is apparent that the speed imparted to the strip is suitable when one element of the graph is oriented appreciably at 45° in relation to the direction of displacement of the strip.

The annexed drawing represents diagrammatically, as an example, one embodiment of an apparatus in conformity with the invention.

The apparatus illustrated has two input shafts 5 and 16 which, in the use of the device, are turned proportionately to the acoustic bearing and acoustic angular elevation of an airplane as indicated by any known form of listening device. The turning movements given to the two input shafts move the four sliding stylus blocks 50 through the medium of connecting mechanism hereinafter described.

On one end of a horizontal shaft 1 there is keyed a slotted crank 2. On this same shaft there is mounted, so as to be idle, a disc 3. The latter has cut therein a groove 4 in spiral form ($p=K \cot \phi$, in polar co-ordinates), on its side which faces the slotted crank 2. The shaft 1 rotates proportionally to the angle of acoustic bearing $Ga$ of the airplane. Its rotation is controlled by a shaft 5 formed of two sections between which there is interposed a differential 6. The shaft 5 is connected to the shaft 1 by means of a pair 7 of bevel gears. A vertical shaft 8 of the differential 6 is intended to make it possible to subtract from the acoustic bearing a variable angle $a$. It is equipped with an operating handwheel 9, bearing a pointer, which it suffices to orient roughly by ear in the direction where one hears the airplane coming.

The acoustic bearing is likewise transmitted to the disc 3 from the shaft 1 by the pair of bevel gears 10, the shaft 11, a pair of bevel gears 12, the differential 13, the shaft 14, and the screw 15 which engages with suitable teeth at the periphery of the disc 3. The third shaft 16 of the differential 13 rotates proportionally to the angle of acoustic angular elevation $Sa$. It is connected by the couple of bevel gears 17 to a vertical shaft 18. On this latter shaft there is keyed a cylindrical cam 19 having a groove 20, whose development on a plane corresponds to the curve representing cosec $Sa$ as a function of $Sa$.

At one side of the cam 19, there is a strip of paper 21 which is moved by two rollers 22, 23, the latter being driven by a motor 37 at a uniform speed. One may give the paper 21 four different speeds by means of a speed-change mechanism, which may be constructed and operated precisely like the change-speed gears of an automobile.

In the groove of the cam 19 there is engaged one end of a follower bar 44 which is connected to the last articulation of a Nuremberg chain 45. At the other intersections of the elements of this chain there are articulated by one end three other bars 46 to 48 which are oriented, like the bar 44, transversely to the direction of displacement of the record strip 21. Toward their other end the bars 44, 46, 47 and 48 each bear a sliding block 50 equipped with a stylus or with a tracing roller. These blocks are slidingly mounted on a common vertical rod 51 having at its upper end a horizontal arm 52 which engages the slot in the arm 2 and the spiral groove 4 in the disc 3. The operator adjusts the angle $\alpha$ in such a way that the styli shall be brought as far to the left as possible on the record strip. If the commencement of the lines traced by the styli is oriented approximately at 45°, the speed of the strip is suitable and corresponds to the greatest sensitivity of the determination. If not, the operator increases the speed if the tracing is too nearly horizontal, or decreases it if the tracing is too nearly vertical.

The disc 3 and the sliding crank 2 displace the styli transversely to the record strip according to:

$$X_a = \cot S_a \cos (G_a - \alpha)$$

This movement is given to the blocks 50 on which the styli are mounted by the rod 51 whose lateral displacement is made proportional to the cosine of the angle $G_a - \alpha$ by its engagement with the crank 2, and proportional to cotangent $S_a$ by its engagement with the groove 4 in the disc 3, because the relative movement of the crank and disc is proportional to $S_a$ so that the distance of the cross-piece 52 from the axis of the shaft 1 is proportional to the cotangent of $S_a$.

On the other hand the styli are displaced in the direction of travel of the strip by a complementary movement proportional to cosec $S_a$ with a coefficient which varies from 6 to 3, by units, from the bar 48 to the bar 44. This complementary movement introduces into the tracing the time $\theta$ of transit of the sound of the airplane to the observation point for a supposed altitude Z, for $$\theta = \frac{Z \operatorname{cosec} S_a}{v}$$

where $v$ is the speed of sound in the air.

With the four styli that are illustrated and the four speeds provided for the record strip, one is able to cover the following scales of altitudes:

|          | Stylus 1 | Stylus 2 | Stylus 3 | Stylus 4 |
|----------|----------|----------|----------|----------|
| Speed I   | 3,000 | 4,000 | 5,000 | 6,000 |
| Speed II  | 1,500 | 2,000 | 2,500 | 3,000 |
| Speed III | 600   | 800   | 1,000 | 1,200 |
| Speed IV  | 300   | 400   | 500   | 600   |

The relative precision of the determination increases rapidly with the duration of the recording and with the actual speed of the airplane. For an airplane flying at 100 meters per second at least, if one effects the determination after passage of the airplane to the point that is closest to the listening station, one is able to attain a precision greater than ten per cent.

Of course the invention is not limited to that which has been described and illustrated, but may have various modified forms. Thus, the Nuremberg chain connecting the stylus-carrying bars might be replaced by a series of gear-wheels of different diameters, carried by one and the same shaft and engaging with racks, each of which is integral with one of the stylus-carrying bars.

What I claim is:

1. The method of determining the altitude of an airplane from the angular elevation and angular bearing of sound received from the airplane at a single station, which consists in plotting from the acoustical elevation and bearing of the airplane a family of curves representing as a function of time one and the same rectangular coordinate of a horizontal projection of the airplane for different assumed values attributed to the altitude, and selecting the one of these curves which most closely approximates a straight line to ascertain which of the assumed values is the closest to the real altitude.

2. A device for use in determining the altitude of an airplane from the angular elevation and angular bearing of sound coming from the airplane, which comprises a recording strip, means for moving the recording strip longitudinally at a constant speed, a plurality of styli engaging the recording strip, two input shafts, a common means for moving all the styli across the recording strip, a connection between said means and the two input shafts so arranged that the transverse movement given to the styli is proportional to the cosine of the turning movement given to one of the input shafts multiplied by the cotangent of the turning movement given to the second input shaft, separate means for moving each one of the styli lengthwise of the strip, a connection between the lengthwise moving means of one stylus and the second input shaft arranged to give this stylus movement lengthwise of the strip proportional to the cosecant of the turning movement of the second shaft, and a connection between this moving means and the separate moving means of the other styli arranged to make the lengthwise movements of the other styli fixed fractions of the lengthwise movement of the first stylus, so that when the first input is given a turning movement proportional to the acoustic bearing angle of an airplane and the second input shaft is given a turning movement proportional to the acoustic elevation angle of the airplane the longitudinal movement of the one of the styli which traces a straight line on the recording strip indicates the altitude of the airplane.

3. A device for use in determining the altitude of an airplane from the angular elevation and angular bearing of sound coming from the airplane, which comprises a recording strip, means for moving the recording strip longitudinally at a constant speed, a plurality of styli engaging the recording strip, a plurality of separate blocks on which the styli are mounted, a common transversely movable rod extending lengthwise of the recording strip and slidably engaging all said blocks, a plurality of individual rods perpendicular to said rod extending across the recording strip and each engaging one of the stylus blocks, a Nuremberg chain connecting said last-mentioned rods, two input shafts, a slotted crank connected to one input shaft, a disc containing a spiral groove connected to the other input shaft, an arm on said common rod extending through the slot in the crank and the slot in the disc, a cam connected to the second input shaft, and a cam follower on one of said individual rods engaging said cam.

4. A device for use in determining the altitude of an airplane from the angular elevation and angular bearing of sound coming from the airplane, which comprises a recording strip, a plurality of styli engaging the recording strip, two input shafts, common means for moving all the styli across the recording strip, connections between said means and the two input shafts, separate means for moving each one of the styli lengthwise of the strip, a connection between the lengthwise moving means of one of said styli and the second input shaft, a connection between this moving means and the separate moving means of the other styli such that they are given lengthwise movements which are fixed fractions of the lengthwise movement of the first stylus, a constant-speed motor, and change-speed gearing connecting the constant-speed motor with the recording strip so that the speed of the recording strip may be changed to change the inclination of the lines traced by the styli.

5. A device for use in determining the altitude of an airplane from the angular elevation and angular bearing of sound coming from the airplane, comprising first and second input shafts, two shafts connected to one of the input shafts through a differential so that the turning movement given to the input shaft is equal to the sum of the turning movements of said two shafts, a recording strip moved lengthwise at constant speed, a plurality of styli engaging the recording strip, a common means for moving all the styli across the recording strip, connections between said common moving means of the two input shafts, a connection between one of the styli and the second input shaft arranged to move said stylus lengthwise of the strip, and a connection between this stylus and the other styli arranged to give the other styli lengthwise movements which are fixed fractions of the lengthwise movement of the first stylus.

ANTONIN SVOBODA.